(12) United States Patent
Schulze

(10) Patent No.: US 6,373,891 B1
(45) Date of Patent: Apr. 16, 2002

(54) SYSTEM AND METHOD FOR IMAGE SEQUENCE PROCESSING

(76) Inventor: Klaus Schulze, Ringstrasse 12, D-23896 Nusse (DE)

( * ) Notice: Subject to any disclaimer, the term of this patent is extended or adjusted under 35 U.S.C. 154(b) by 0 days.

(21) Appl. No.: 09/110,431

(22) Filed: Jul. 2, 1998

(30) Foreign Application Priority Data

Jul. 2, 1997 (DE) .......................................... 197 28 099

(51) Int. Cl.[7] .................................................. H04B 1/66
(52) U.S. Cl. .................. 375/240.01; 375/240; 382/176; 382/170; 382/171; 382/270
(58) Field of Search ........................... 375/240, 240.01, 375/240.03; 348/405, 403, 412, 419, 420, 399, 396, 395; 382/176, 170, 171, 173, 232, 270

(56) References Cited

U.S. PATENT DOCUMENTS 5,559,557 A * 9/1996 Kato ........................... 348/405
5,742,704 A * 4/1998 Suzuki et al. ............... 382/176

FOREIGN PATENT DOCUMENTS

DE 43 09 957 7/1994 ............ G06K/9/64

* cited by examiner

*Primary Examiner*—Chris Kelley
*Assistant Examiner*—Shawn S. An
(74) *Attorney, Agent, or Firm*—Senniger, Powers, Leavitt & Roedel

(57) ABSTRACT

A system and method for recognizing image sequences. A video decoder having a raster/cluster converter and an image carousel having a memory organized as a shift register are connected to each other by a discrete cosine transform (DCT) transformer. The system extracts characteristics from individual images of an image sequence provided by the video decoder based on the brightness of the images. A correlator connects a reference memory to the image carousel such that the image sequence from the video decoder is supplied to the correlator as a characteristic vector and combined with a reference sample for storing in the reference memory. The system decorrelates the characteristics by a quasi-stochastic characteristics extraction over a plurality of the images, digitizes the characteristics, and compares the digitized characteristics to the reference sample.

32 Claims, 11 Drawing Sheets

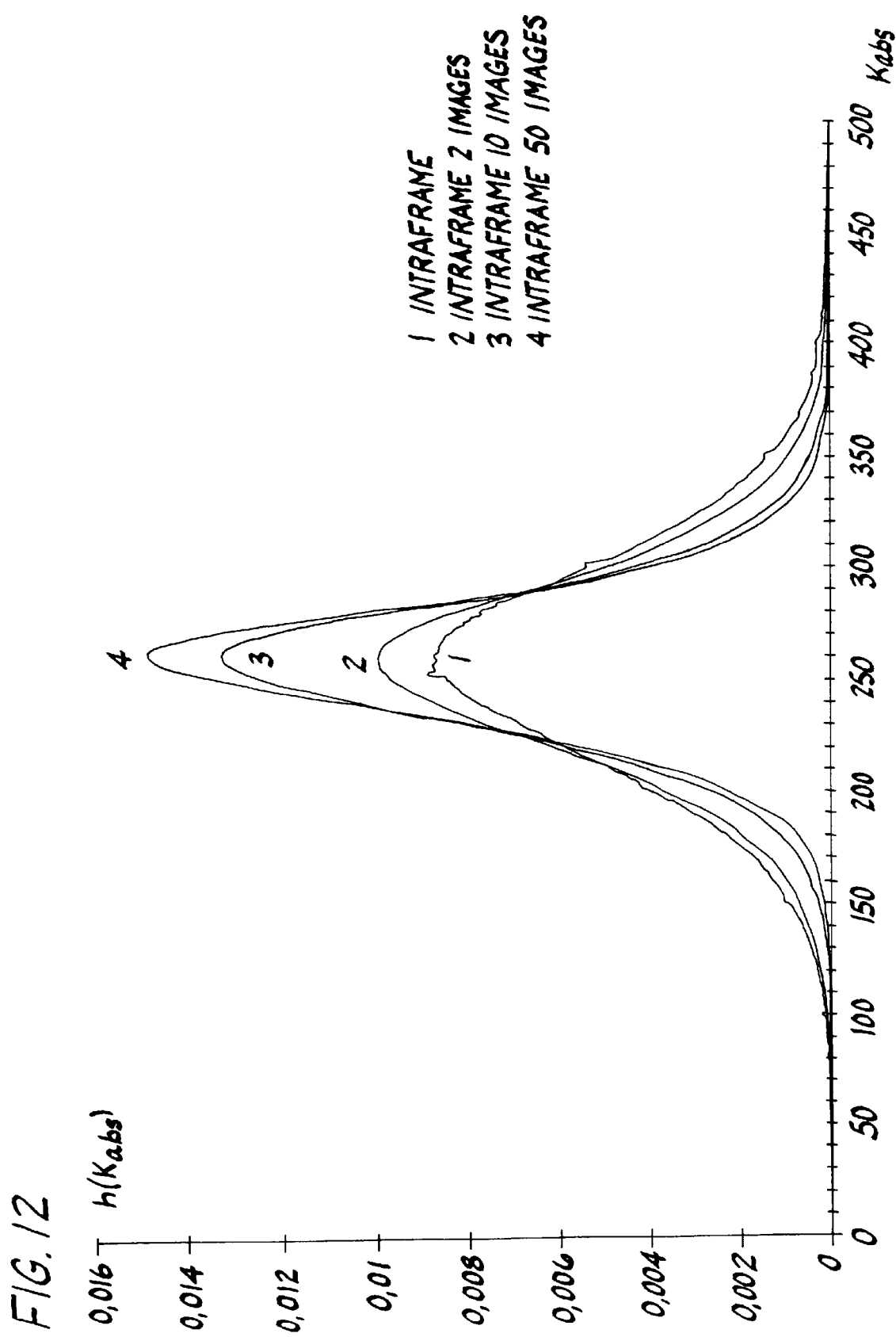

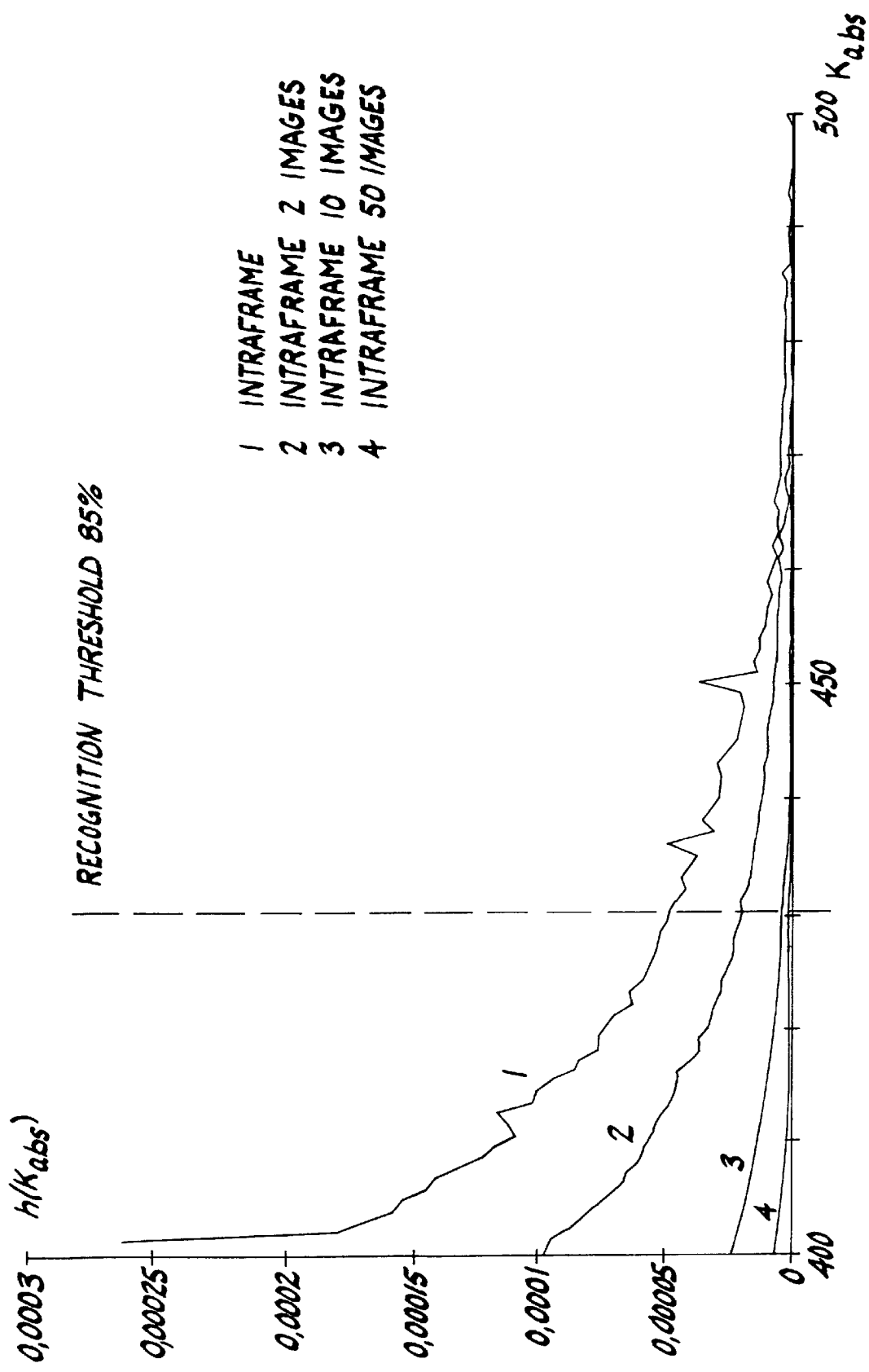

SYSTEM AND METHOD FOR IMAGE SEQUENCE PROCESSING

BACKGROUND OF THE INVENTION

The invention pertains to a system and method for recognizing unique image sequences, commercials, for instance, in which characteristics are extracted from the individual images regarding their brightness, digitized and compared to a reference sample.

Image sequences that consist of a number of successive images tied together in terms of their contents are to be recognized in, for instance, television at each new broadcast. These image sequences can be commercials, old films or video clips, or political items such as campaign segments. Common to all the aforesaid applications is the fact that the dissemination of the image sequences is to be recorded for legal reasons due to fees to be collected or for statistical reasons. In this regard, unique image sequences means that, in their content, the images remain preserved in their original form, that is to say, all image points are unique in brightness and hue and thus unchangeable. In copying by high-quality systems, this unique arrangement is not changed or supplemented in any value. The concept of "uniqueness" thus also refers to copied image sequences.

Commercials are typically broadcast by television stations at times that are particularly interesting to the advertisers, because the reach is particularly large. There is thus an interest for the advertiser to check whether its commercial was actually broadcast at the selected time. A commercial changes appearance over time, i.e., it becomes shorter or some images are changed or completely replaced. This new image sequence is now to be differentiated from the original version.

A method for identifying unique image sequences is known from DE 43 09 957 Cl. Therein, individual image elements, known as pixels, are gathered into groups or blocks, which are called clusters and whose luminance or brightness values are digitized and compared as characteristics with the characteristics of known images or reference samples.

Because of the necessary data compression or data reduction, the probability of false recognition of an image is relatively high. In order to reduce the number of false recognitions, several images in sequence are therefore extracted in the known method. The disadvantage here is that successive images are normally very similar so that the characteristics found frequently lead to chance similarities, without similar images actually being present. These so-called chance false recognitions do not in themselves impair the recognition of a commercial, but do lead to a large accumulation of data, which burdens the computer.

Therefore, a method of preventing the accumulation of data and reducing the number of false recognitions is desired.

A device for carrying out a method for identifying unique image sequences is also known from DE 4309 957 Cl. The known device has the drawback that an extraction of characteristics is possible only from successive images, so that the characteristics extracted from the images correlate with one another and lead to a high number of false recognitions.

Therefore, a device with which a quasi-stochastic extraction of characteristics is possible is also desired.

SUMMARY OF THE INVENTION

The problem of relatively large data accumulation and false recognitions is solved according to the invention in that the characteristics are decorrelated by a quasi-stochastic method across several images.

By virtue of the fact that, instead of extracting characteristics from adjacent images, characteristics are extracted according to a quasi-stochastic method across several images, the chance similarities of successive images can be neglected, since the connections of successive images are broken up. The number of chance false recognitions and the associated accumulation of data burdening the computer are thus reduced.

According to a preferred embodiment of the invention, selected characteristics of individual images are written in an ordered sequence into a memory, organized as a shift register, of an image carousel and read out according to a quasi-stochastic process in a nonselective access. The access to the characteristics is done here with a maximum jump width across the images. At the same time, access to the characteristics is done with the greatest possible distance inside the images. By virtue of this measure, a decorrelation of the characteristics is achieved, because the temporal and spatial connections are broken up.

According to another preferred embodiment of the invention, a two-stage processing of the method is conducted, with a first stage for general recognition and a second stage for detailed recognition. General recognition is so reduced in data accumulation that it is suitable for real-time. It permits the recognition of a commercial without having to be able to determine any mutations which might be present. Detailed recognition takes place only if the general recognition process has assigned an image sequence or commercial to the existing reference example. Detailed recognition then provides the final certainty and reveals spatial and temporal mutations.

According to an additional preferred embodiment of the invention, the change of brightness inside a cluster formed from spatially cohesive pixels is utilized.

In the process, the clusters are subjected to a discrete cosine transform. One of the low-frequency alternating coefficients is reduced to its sign and used as the characteristic. An image sequence is divided up into time slices of constant length, each time slice representing an autonomous unit. which is correlated. The images of a time slice are thus coded in an extremely data-saving manner. The recognition or general recognition of a commercial results if the individual time slices are recognized in the correct sequence and in the right spatial intervals.

The invention further pertains to a system for carrying out the method.

The problem of quasi-stochastic image extraction of characteristics is solved in that an image carousel having a memory organized as a shift register is connected at one end via a DCT transformer to a video decoder with raster/cluster converter and at the other end via a correlator to a reference memory such that an image sequence fed by the receiver into the video decoder can be supplied to the correlator as a characteristics vector and compared to a reference sample that can be stored in the reference memory.

A quasi-stochastic extraction of characteristics is enabled in a simple manner by the use of the image carousel, wherein the characteristics of individual images are decorrelated.

According to another preferred embodiment of the invention, a branch is provided between the DCT transformer and the image carousel to a detailed recognition memory, which is constructed as a FIFO (first-in, first-out) shift register in which all the characteristics of an image sequence can be stored.

By the use of the FIFO shift register, it is possible to carry out detailed recognition only after the general recognition, which has taken place in real-time.

Additional details of the invention are seen from the extensive description below and the attached drawings, in which preferred embodiments of the invention are illustrated as examples.

Other objects and features will be in part apparent and in part pointed out hereinafter.

BRIEF DESCRIPTION OF THE DRAWINGS

FIG. 12 is a representation of the distribution of chance agreements of the binary patterns for various decorrelating measures; and FIG. 13 is a representation of the effect of the decorrelating measures above the recognition threshold as a detail from FIG. 12.

Corresponding reference characters indicate corresponding parts throughout the drawings.

DETAILED DESCRIPTION OF THE INVENTION

Figure 1:
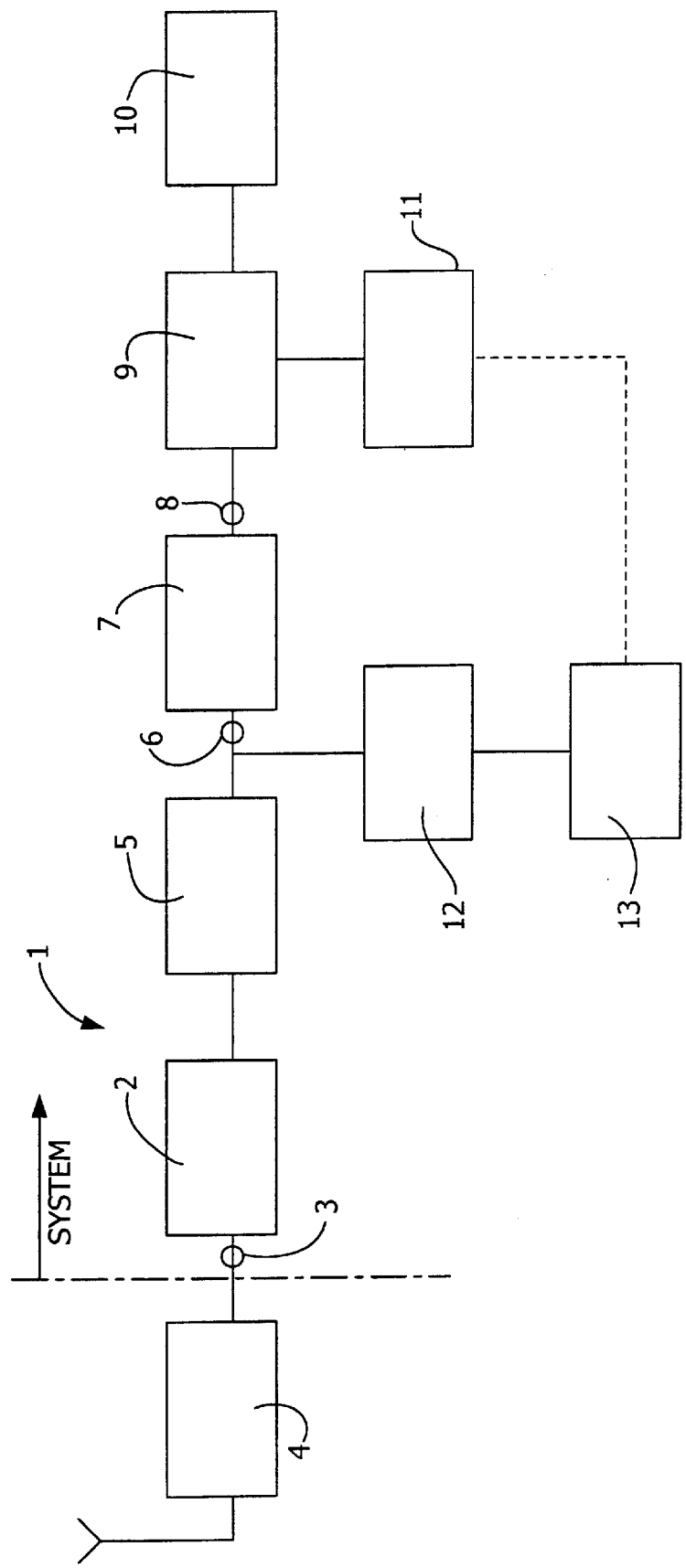
FIG. 1 is a block schematic diagram of a device for recognizing unique image sequences

Referring now to FIG. 1, a system 1 for recognizing unique image sequences consists essentially of a video decoder 2 with raster/cluster converter and connected at its input 3 to the video output of a receiver 4. The output of the video decoder 2 is connected to one input of a discrete cosine transform (DCT) transformer 5. The output of the DCT transformer 5 is connected to one input 6 of an image carousel 7 (see FIG. 11). The image carousel 7 is connected at its output 8 to the input of a correlator 9. The correlator 9 is in turn connected to a reference memory 10. The correlator 9 is additionally connected to an evaluation unit 11 for general recognition. A FIFO shift register 12, connected to an evaluation unit 13 for detailed recognition, is inserted between the DCT transformer 5 and the image carousel 7. In a first stage of the signal processing, a general recognition is conducted by the evaluation 11 for general recognition. If the evaluation unit 11 for general recognition has found an image sequence 14 (see FIG. 2) with such similarity to a reference sample stored in the reference memory 10 that this is with great probability (e.g., >90%) the sought-after commercial or image sequence 14, the evaluation unit 13 for detailed recognition receives a recognition signal from the evaluation unit 11 for general recognition, and starts in a second processing stage with the data stored in the FIFO shift register 12. The detailed recognition then supplies the final certainty and reveals spatial and temporal mutations.

Figure 2:
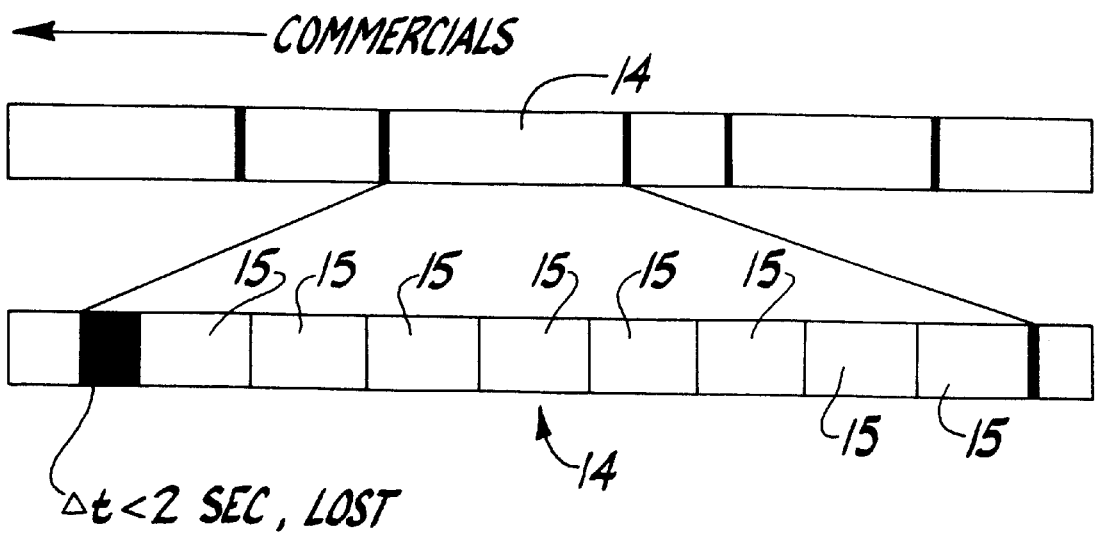
FIG. 2 is a schematic representation of commercials as image sequences with a selected image sequence broken down into time slices.

Referring to FIG. 2, the entire image sequence 14 must be coded because of temporal mutation (shortening or modification of a scene). It is practical for the image sequence 14 to be divided for this purpose into so-called time slices 15 of, for instance, two seconds in length. The time slices 15 represent independent units or segments, each of which is correlated by itself. The recognition (general recognition) of an image sequence 14 results when the individual time slices 15 are recognized in the correct order and in the correct time intervals by the evaluation unit 11,13.

If a time mutation is present, then individual time slices 15 are missing, while the others are recognized in the expected order. The aforesaid length of approximately two seconds has been determined to be favorable in numerous experiments, but can experience corrections, insofar as there are certain lengths for commercials or image sequences 14 and the time slices 15 are then chosen such that these lengths can then be distributed over the time slices without a remainder. For example, if the shortest commercial length is seven seconds, it follows that the length of the individual time slices 15 is 1.75 seconds. Otherwise a remainder that can no longer be divided up remains uncovered in the correlation.

Figure 3:
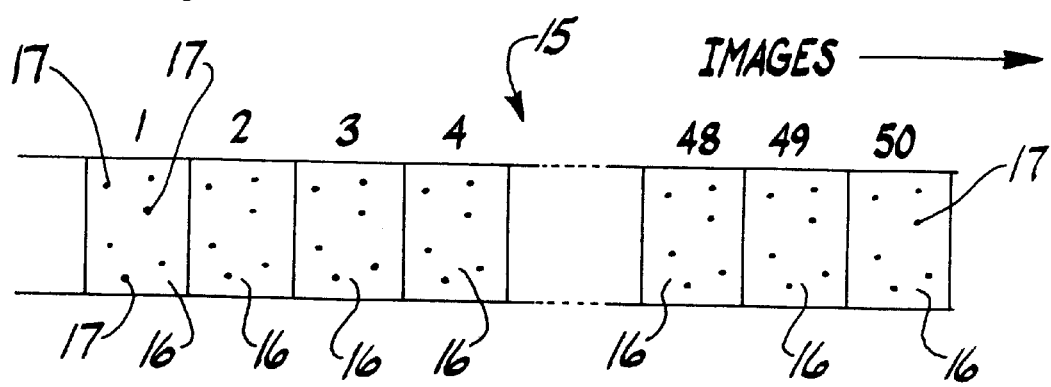
FIG. 3 is a schematic representation of the images of a single time slice with characteristics.
Figure 5:
FIG. 5 is an example of a mutation in which a product has lost the attribute "neu"
Figure 6:
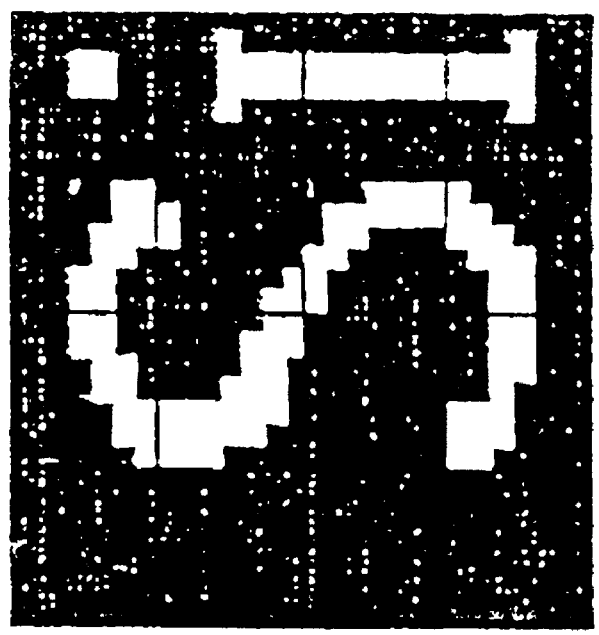
FIG. 6 is an example of a local mutation inside an image, in which one letter in an inscription (detail) was changed.
Figure 6:
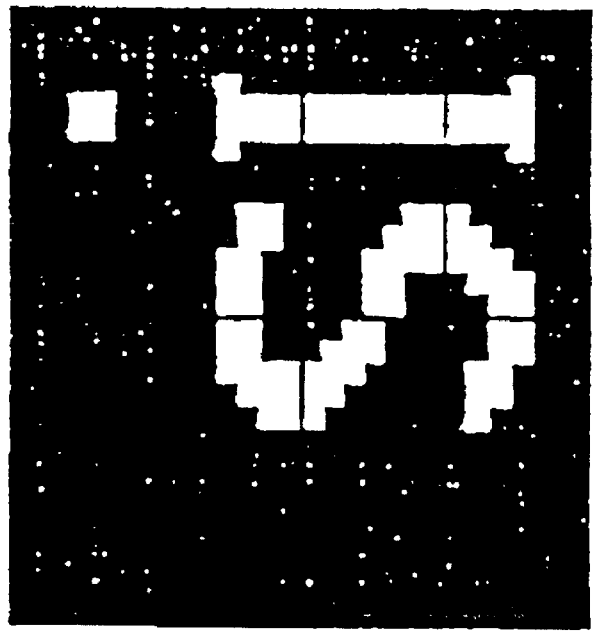

In FIG. 3, local mutations, that is, changes inside of an image 16 of an image sequence 14, extend over a range that can be expressed in pixels (image points). FIG. 5 is an example of a mutation in which a product has lost the attribute "neu" (i.e, "new" in German). FIG. 6 shows an example in which a letter was changed in an inscription (detail). The significant changes cover a range of 32×32 pixels. For detailed recognition, that is, for the recognition of any spatial mutation present, each image is divided into areas of roughly the same size which must be correlated (compared) as independent units with the corresponding areas of other images in the processing unit 13. For coding a pixel group, that is to say, a cluster, an alternating component of the luminance or brightness inside the cluster is utilized. In very general terms, this alternating component indicates the change of brightness inside the cluster, in contrast to a constant or uniform component, which is marked with medium brightness. The changing of brightness can take place in a variety of ways: it can be a simple gradient in a certain direction or a multiple light-dark alternation. It is practical for the discrete cosine transform performed by the DCT transformer 5 to be used for the detection of the light-dark alternation. This discrete cosine transform is also employed in well-known compression algorithms, such as JPEG and MPEG, and is therefore implemented in highly integrated chips, for instance, the Zoran 36050. In these image compression methods, the image is divided up into clusters (blocks) 8×8 pixels in size (raster to cluster conversion), which are then subjected to a two-dimensional discrete cosine transform. In this way, a frequency-domain representation of the images is obtained.

Figure 7:
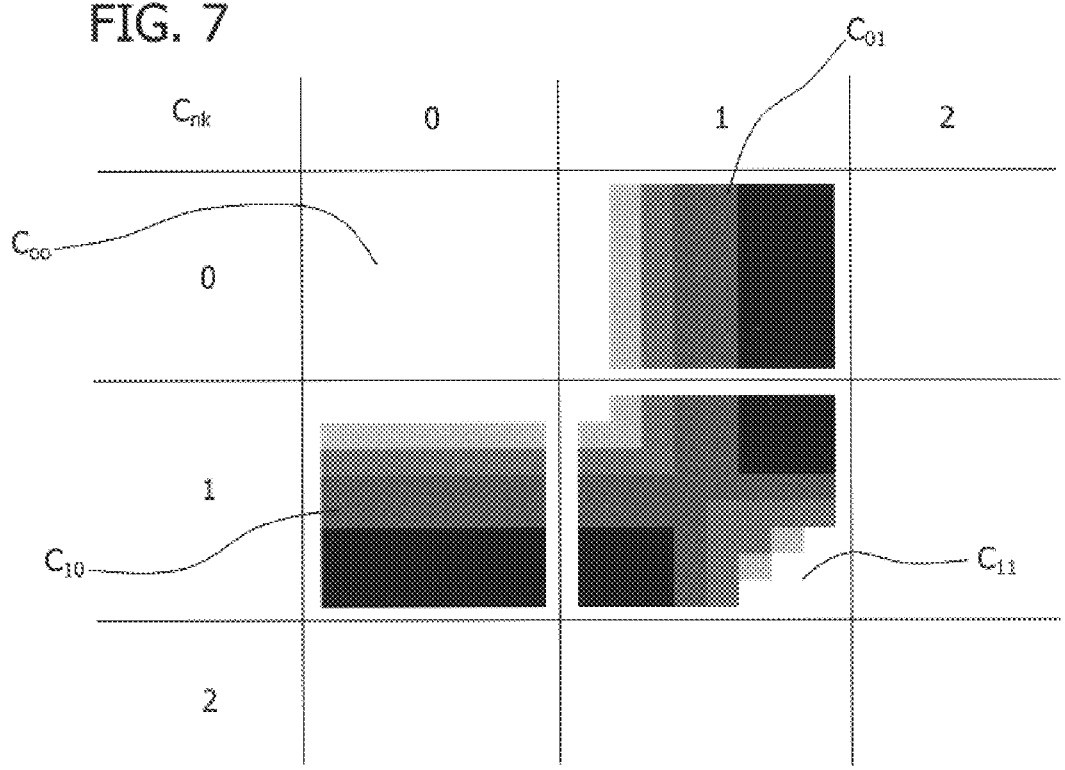
FIG. 7 is a representation of spectral reference samples in the form of base images of the low-order coefficients.

The compression consists in essence of the high-frequency components being strongly suppressed or even omitted. The spectral reference samples for the individual coefficients $C_{nk}$ are called base images, of which the lowest-order ones are shown in FIG. 7. The upper left base image ($C_{00}$ coefficient), applied to an 8×8 pixel cluster, supplies the constant component, that is, the mean brightness of the cluster. The upper right base image ($C_{01}$ coefficient) checks to what extent the illustrated brightness profile is present in the cluster being examined. It thus supplies the lowest spectral line of the image information according to the generally constant component. The other base images from FIG. 7 supply corresponding information in other image directions. The base images for the higher-order coefficients are not shown, since they have no significance for the present invention. The discrete cosine transform has the property that essential information that was present in the original area in all support values is concentrated after the transform in a few components. That is, the essential energy components are located in the so-called DC coefficients (constant component) and in the lower-order AC coefficients (low-frequency alternating components).

Table I represents the variants of individual coefficients of a discrete cosine transform. As shown, the energy for higher-order AC coefficients decreases. It is to be understood that Table I may be expanded for higher-order coefficients which are not shown. The energy component in the $C_{01}$ coefficient, for instance, can be roughly doubled if a horizontal and vertical decimation is employed. This is understood to mean the averaging summation of four quadratically arranged pixels into a new pixel. This process is known as down sampling. In this manner a cluster comprising 16×16 pixels is reduced to a cluster 8×8 pixels in size, to which the discrete cosine transform is then applied. The $C_{01}$ coefficients now generated contains in general twice the power of coefficients obtained from an original 8×8 cluster. In the hardware implementation, this process results in part from the line interlacing methods common in television, in which the transmitted images are broadcast as half-images interlaced line-by-line. If only one half-image is considered, then a vertical down sampling is already present. Horizontal down sampling can additionally be set in common commercial chip implementations.

TABLE I

| $C_{nk}$ | 0 | 1 | 2 |
|---|---|---|---|
| 0 | 120000 | 6200 | 1600 |
| 1 | 6000 | 1400 | 600 |
| 2 | 1500 | 600 | 340 |

Figure 8:
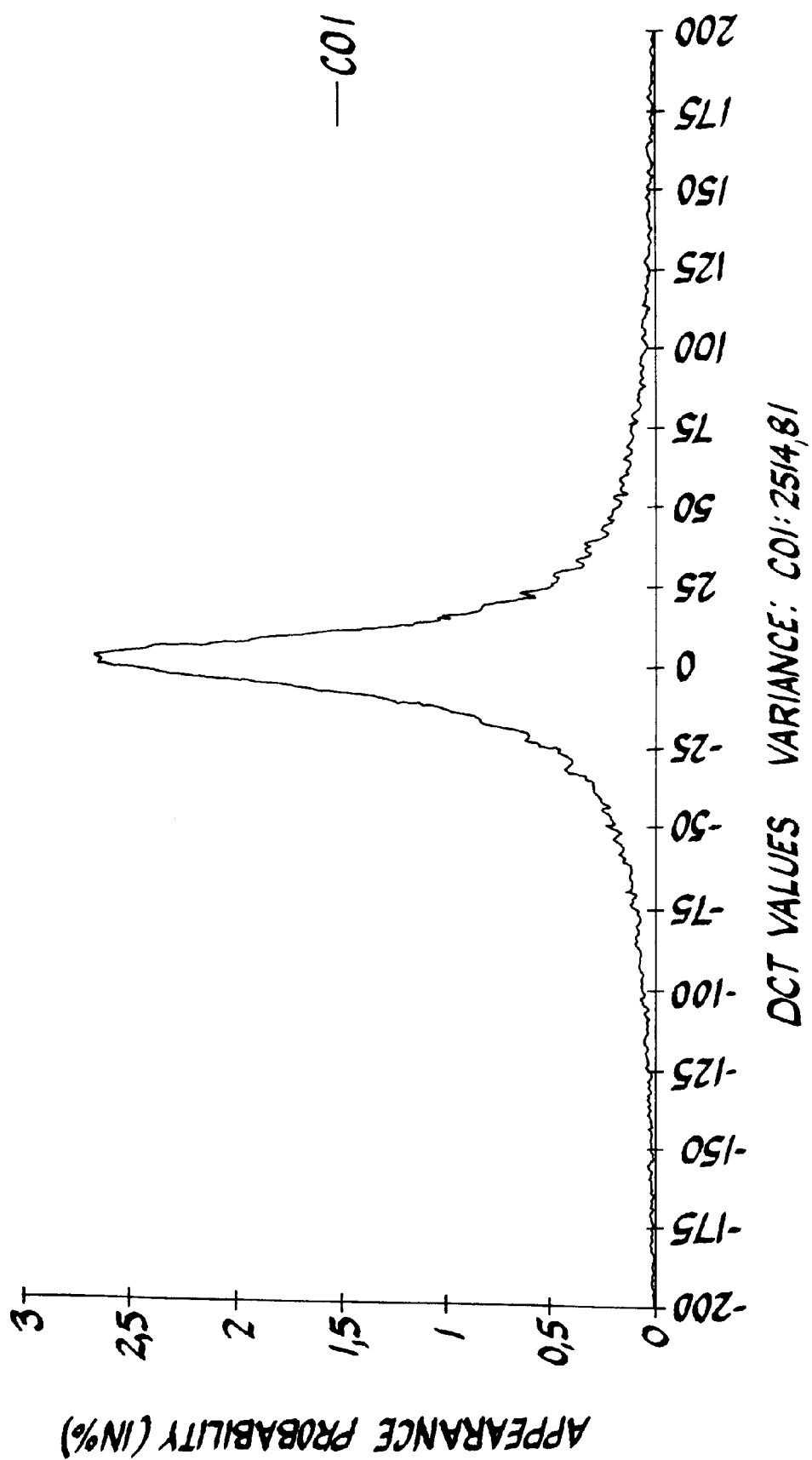
FIG. 8 is a representation of the amplitude distribution density of the coefficients of an arbitrary image without down sampling.
Figure 9:
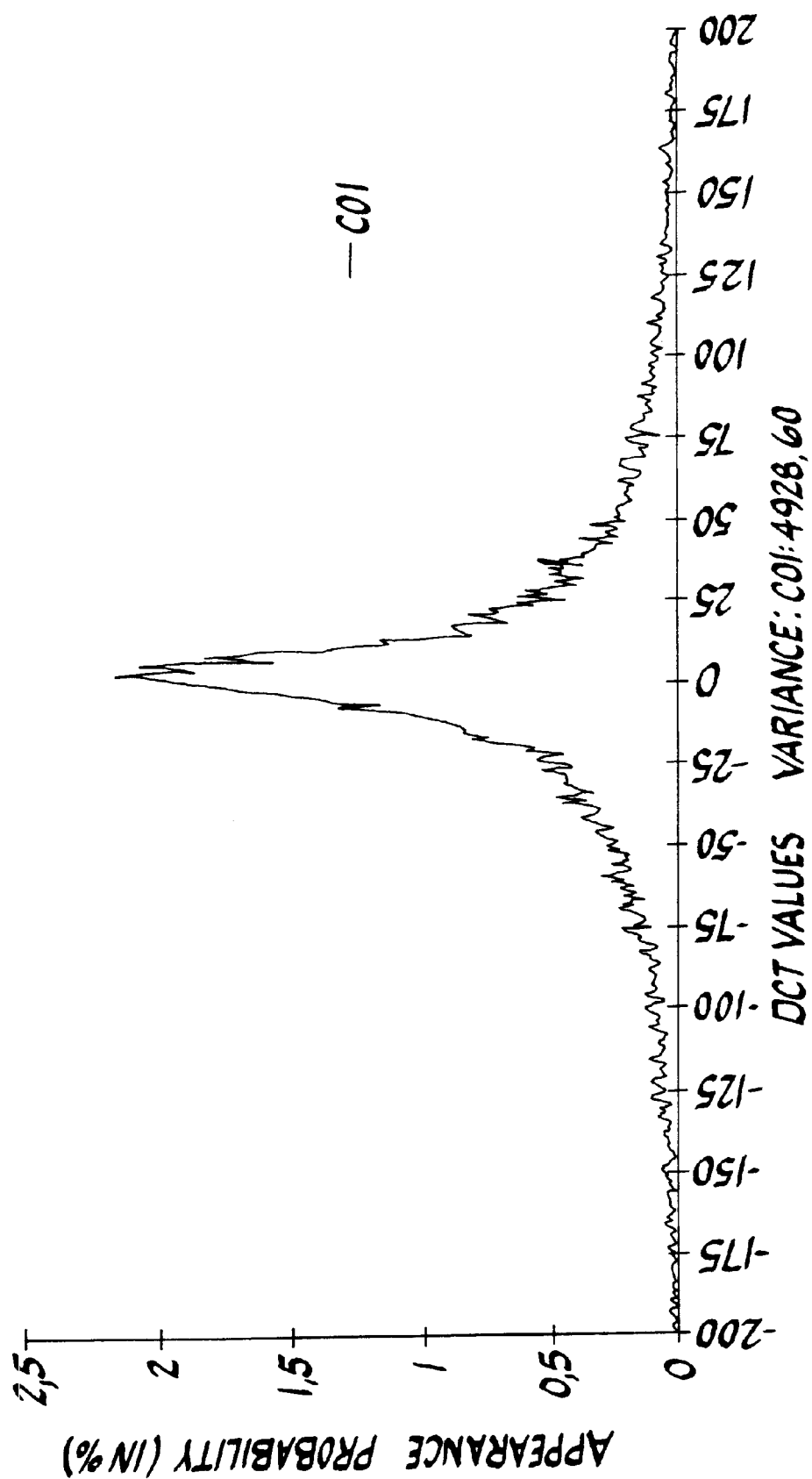
FIG. 9 is a representation of the amplitude distribution density of the $C_{01}$ coefficient of an arbitrary image with down sampling.

FIG. 8 shows the amplitude distribution density of the $C_{01}$ coefficient of an arbitrary image 16 without down sampling. FIG. 9 shows the amplitude distribution density of the $C_{01}$ coefficients from FIG. 8 with down sampling. The somewhat broader curve from FIG. 9 numerically supplies roughly twice the variance of the curve from FIG. 8.

After all images 16 of a time slice 15 have been broken down into clusters 8×8 pixels in size—in case of decimation, these are clusters of 16×16 pixels——and transformed in the frequency domain, the lowest powered alternating coefficient, i.e., $C_{01}$ or $C_{01}$ of each cluster, is subjected to a further data reduction in that only its sign continues to be analyzed. A cluster of 8×8 pixels is thus represented by one bit, which indicates the sign of the alternating coefficient. By virtue of this measure, the data set of a time slice thus obtained has the following crucial advantages: the entire image sequence is coded in an extremely data-reducing manner. Each bit is a local feature that is independent of the level of the image signals and their signal-to-noise ratio.

Table II represents the data reduction of the luminance signal in the CCIR format:

TABLE II

| | Amount of data per image | Reduction factor |
|---|---|---|
| Luminance signal per CCIR 768 × 576 pixel | 442,368 byte | 1 |
| After block formation | 13,824 byte | 32 |
| Block formation with decimation | 3,456 byte | 128 |
| Selection for general recognition | 32 byte | 13,824 |
| Sign function | 4 byte | 110,592 ≈ 1.1 × 10$^5$ |

The data reduction of the CCIR format image signal 768×576 pixels in size is initially roughly 2×10$^3$. For a time slice length of roughly two seconds, this still results in a data amount of roughly 11 kB. This amount of data would be too large for real-time processing of thousands of commercials. General recognition is therefore used as a real-time method for recognizing image sequences without evaluation of any mutations possibly present. Detailed recognition as a non-real-time method then builds on the general recognition, confirms it and allows the analysis of the mutations.

General recognition is already possible with roughly 16 characteristics 17, 18 per image 26. Characteristic 17, 18 is understood to mean the sign bit of the DCT coefficients. Thus, from the 1,728 sign bits of (half) an image, 16 bits, that is, two bytes are extracted according to a defined plan. For each two second time slice 15, this comes to 100 bytes per time slice 15. The extraction scheme counters the spatial connections of the coefficients. Image objects generally have a size that includes several clusters. It is highly probable that identical DCT coefficients will result for these clusters. Characteristics 17, 18 extracted from these clusters are thus not mutually independent and do not improve the recognition quality. The connections are therefore broken up if the 16 characteristics 17, 18 are extracted according to a quasi-stochastic method from clusters lying as far apart as possible. If one proceeds in the same here for each image 16 of a time slice 15, then one obtains altogether a data string which is, for instance, 16×50 =800 bits long. If one assumes independence of the individual bits, then the probability of a chance agreement of two such binary patterns of N possible bits taken k bits at a time is, according to the binomial distribution, $$b(k, N, p) = \binom{N}{k} p^k (1-p)^{N-k}$$

with p as the appearance probability of a characteristic.

In the cases considered here, p=0.5, that is to say, 0 and 1 as the sign bit of a coefficient are equally probable. The binomial distribution is thus reduced to $$b(k, N, p) = \binom{N}{k} p^N$$

If one specifies a lower threshold of 85% for a recognition $$\frac{k}{N} * 100\% \geq 85\%$$

then all similarities of two time slice patterns greater than 85% are evaluated as recognitions. Whether this time slice recognition actually belongs to a genuine image sequence recognition is ascertained by a software plausibility check. Otherwise, a chance agreement is involved, otherwise known as a false recognition.

Figure 10:
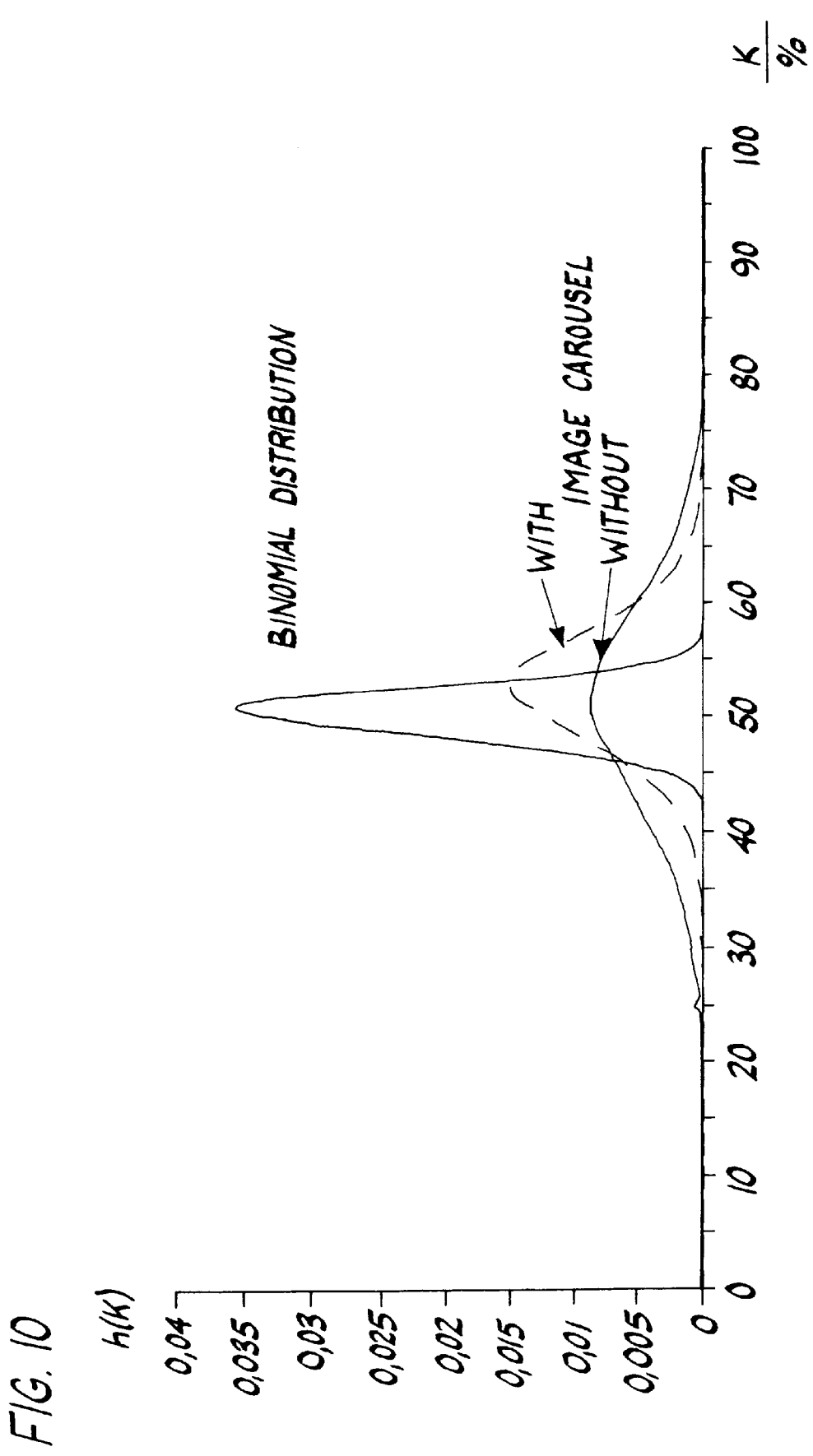
FIG. 10 is a representation of the amount of chance agreement of image sequences with reference sequences in the comparison to the theoretically expected binomial distribution.

FIG. 10 is a representation of the amount of chance agreement of image sequences with reference sequences in the comparison to the theoretically expected binomial distribution.

Figure 11:
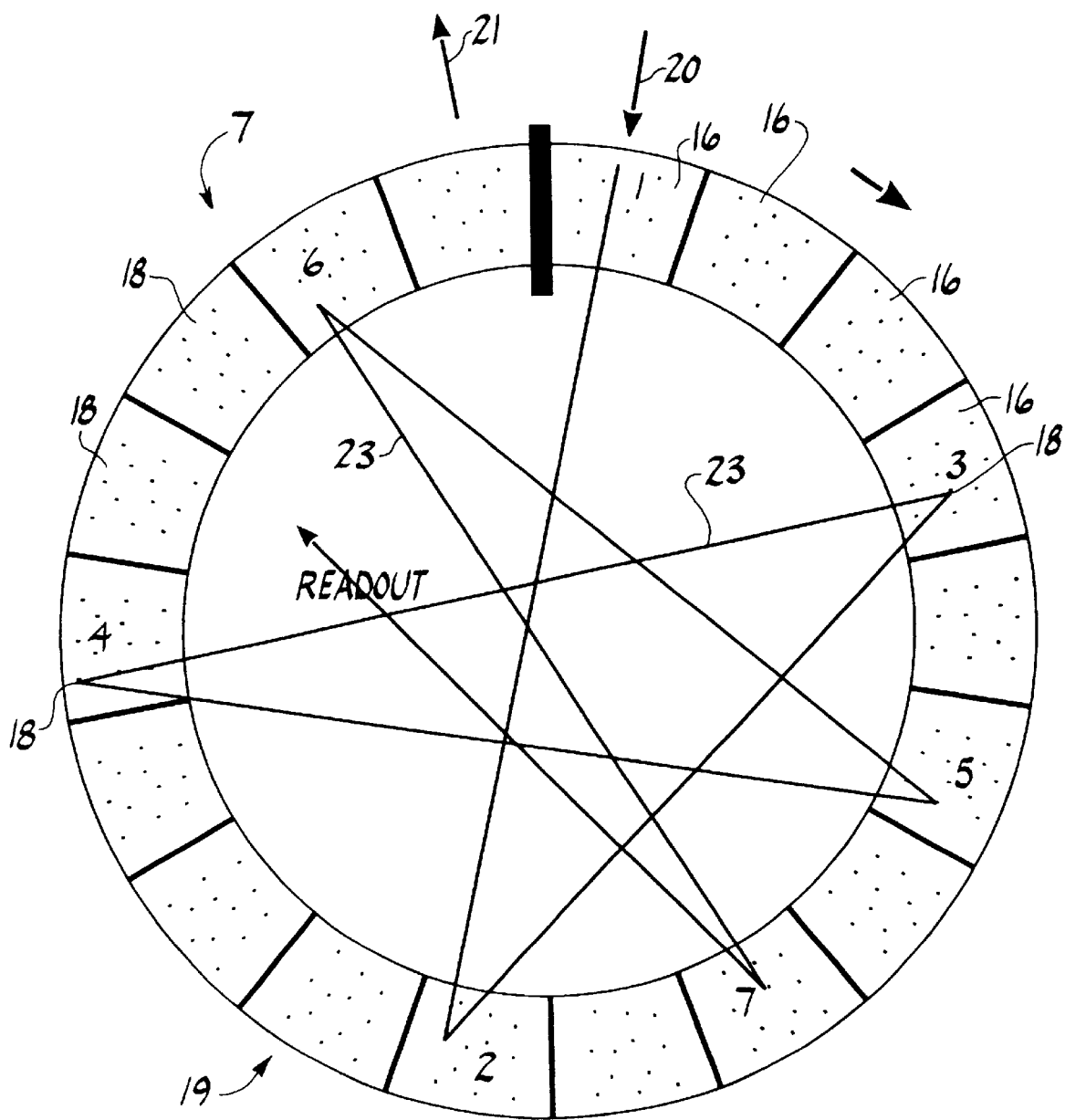
FIG. 11 is a schematic representation of an image carousel.

In order to counter false recognitions, the image carousel 7 of FIG. 11 is provided. The image carousel is a memory 19 organized as a shift register, into which the selected characteristics 17, 18 of the images 16 of a time slice 15 are written in an ordered sequence. The image carousel 7 now has the task of scrambling several images 16 such that patterns are not generated image-sequentially, but according to a quasi-random pattern over several images 16. So-called interframe coding results. The distribution of chance agreement of such interframe codings is illustrated in FIG. 12, wherein the scrambling was undertaken over 2, 10 and 50 images. Curve 1 shows an example of so-called intraframe coding, in which the characteristics are processed in order of the images. In FIG. 13, the area above the recognition threshold of 85% is shown enlarged. After 40 milliseconds each time, the characteristics 17, 18 of a new image 20 are added to the memory 19, while the "oldest" image 21 is shifted out at the end of the memory 19. Between two updates of the memory 19, the N characteristics 17, 18 of a time slice are read out in a nonselective access and made available to the correlator 9 for comparison to the reference samples. The process here is such that no cluster of an image 16 is read out a second time during its residence time in the image carousel 7. The access to the characteristics 17, 18 is done with a maximum possible jump width 23 over the images 16 with simultaneous optimally large distance inside the images 16. By virtue of this measure, a decorrelation of the characteristics 17, 18 is achieved, because the temporal and spatial connection are broken up.

Figure 4:
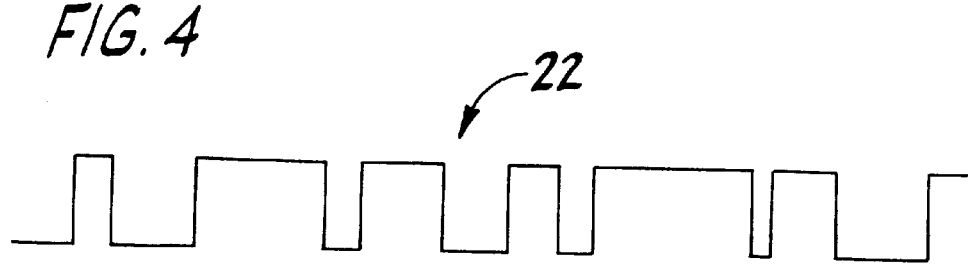
FIG. 4 is a representation of a characteristics vector of the time slice of FIG. 3 as a binary current.

The method can be carried out in the following steps:

a) The image sequences 14 are divided up into time slices 15 that are 1.5 to 2 seconds in length (adaptation to the recognition task).

b) Each image 16 is divided into clusters by analogy to the well-known JPEG method, vertical and horizontal down sampling advantageously being applied. The clusters of the images are subjected to a discrete cosine transform and the sign of each low-order alternating coefficient (preferably $C_{01}$ or $C_{10}$) is employed as the characteristic 17, 18.

c) A subset of 800 to 1000 characteristics 18 from the 1728 characteristics 17 produced according to b) for each image 16 is loaded into the shift register of the image carousel 7 for real-time correlation or general recognition. From here, approximately 800 to 1000 characteristics 18 are extracted per time slice 15 and stored as a characteristics vector 22 for the entire time slice. That corresponds to roughly 16 to 32 bits per image. As an example, FIG. 4 is a representation of the characteristics vector 22 of the time slice of FIG. 3 as a binary current.

d) The characteristics vector 22 generated in item c) is called a reference sample and later in the operation compared correlatively in the form of an NOR operation to test samples generated in the same manner from the running television program. For a similarity greater than a prescribed threshold (e.g., 85%) a recognition is assumed. Together with an exact time stamp for the image, the recognitions, as a measurement of similarity, are entered into a database that contains fields for all reference samples to be compared e) The database is constantly checked by the appropriate software for related time slices 15 that were recognized with the correct image spacing and with sufficient similarity. If a majority of the time slices 25 of an image sequence 14 were recognized, the entire image sequence is considered recognized.

f) The recognition process according to items d) and e) takes place in real-time, so that an image recognition can be reported immediately after the image sequence or commercial was broadcast. Then all the image characteristics 17, for instance, 86,400 bits=10.8 kB for a time slice length of two seconds, which were interim-stored in the FIFO shift register 12, are fed to the detailed recognition unit. Here a correlation of all the images 16, subdivided into areas, for all time slices 15 of an image sequence 14 takes place. This comparison can be performed with selected reference samples, since the image sequence recognition basically already exists.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of recognizing image sequences comprising the steps of:

extracting characteristics from individual images of the image sequences based on the brightness of the images;

decorrelating the characteristics by a quasi-stochastic characteristics extraction over a plurality of the images;

digitizing the characteristics; and comparing the digitized characteristics to a reference sample.

2. The method of claim 1 further comprising the step of writing selected characteristics of the individual images in an ordered sequence into a memory, said memory being organized as a shift register of an image carousel, and the step of reading the characteristics from the memory according to a quasi-stochastic method in nonselective access.

3. The method of claim 2 wherein access to the characteristics takes place with an optimally large jump width over the images.

4. The method of claim 2 wherein access to the characteristics takes place with an optimally large distance inside the images.

5. The method of claim 2 further comprising the steps of adding the characteristics of a new image to the memory after approximately 40 milliseconds and shifting out the characteristics of the oldest image at the end of the memory.

6. The method of claim 1 wherein the comparing step comprises comparing the characteristics to the reference sample with a correlator.

7. The method of claim 1 further comprising the step of dividing the image sequence into time slices of substantially uniform length.

8. The method of claim 7 wherein each time slice represents an independent unit to be correlated.

9. The method of claim 7 further comprising the steps of recognizing the individual time slices and recognizing the image sequence if the time slices are recognized in the correct sequence and in the correct time intervals.

10. The method of claim 7 wherein the time slices are approximately 1.5 to 2 seconds in length.

11. The method of claim 7 further comprising the step of selecting the length of the time slices such that the length of the image sequence is divisible into time slices without a remainder.

12. The method of claim 1 wherein the images are divided up into a number of clusters formed from spatially cohesive pixels.

13. The method of claim 12 wherein the step of extracting the characteristics comprises forming the characteristics as a function of a change in brightness inside the clusters.

14. The method of claim 12 wherein the clusters are subjected to a discrete cosine transform.

15. The method of claim 12 wherein the step of extracting the characteristics comprises using discrete cosine transforms as characteristics.

16. The method of claim 12 wherein the step of extracting the characteristics comprises using low-frequency alternating coefficients as characteristics.

17. The method of claim 16 wherein the low-frequency alternating coefficients are reduced to their signs and used as characteristics.

18. The method of claim 12 wherein the clusters have a size of 8×8 pixels.

19. The method of claim 12 further comprising the step of down sampling the clusters by horizontal and vertical decimation.

20. The method of claim 19 wherein down sampling step comprises summing four quadratically arranged pixels into one new pixel.

21. The method of claim 20 wherein a 16×16 pixels cluster is reduced in size to a 8×8 pixels cluster by down sampling.

22. The method of claim 1 further comprising the step of conducting two-stage processing, said two-stage processing including a first stage for general recognition and a second stage for detailed recognition.

23. The method of claim 22 wherein the general recognition is reduced in its data accumulation such that it is suitable for real-time use.

24. The method of claim 22 further comprising the step of dividing the image sequence into time slices of substantially uniform length wherein the characteristics are extracted from the individual images of the time slices for general recognition and loaded into the memory of the image carousel for real-time-capable correlation and extracted according to an access method with a decorrelating effect and further processed as a characteristics vector for each time slice.

25. The method of claim 24 wherein the characteristics vector of each time slice is compared to a corresponding reference sample in the form of an XNOR operation and entered into a database which contains appropriate fields for all reference samples to be compared.

26. The method of claim 25 wherein the database is continually checked by suitable software for related time slices that were recognized in the correct graphical spacing and with sufficient similarity.

27. The method of claim 26 wherein the image sequence is considered recognized if a majority of the time slices of the image sequence were recognized.

28. The method of claim 22 wherein the detailed recognition takes place only if general recognition has assigned the image sequence to the existing reference sample.

29. The method of claim 28 wherein all the characteristics that are summarized into image areas are processed.

30. A system for recognizing image sequences comprising:
   a video decoder having a raster/cluster converter;
   an image carousel having a memory organized as a shift register;
   a discrete cosine transform (DCT) transformer, said image carousel being connected to the video decoder via the DCT transformer;
   a reference memory; and
   a correlator, said image carousel being connected to the reference memory via the correlator such that an image sequence from the video decoder is supplied to the correlator as a characteristic vector and combined with a reference sample for storing in the reference memory.

31. The system of claim 30 further comprising a detailed recognition memory between the DCT transformer and the image carousel.

32. The system of claim 31 wherein the detailed recognition memory comprises a first-in, first-out (FIFO) shift register for storing characteristics of the image sequence from the video decoder.

* * * * *